United States Patent
Kohler

[15] 3,684,334
[45] Aug. 15, 1972

[54] MOUNTING FOR SPINDLE BEARING HOUSINGS

[72] Inventor: Gisbert Kohler, Stuttgart, Germany

[73] Assignee: SKF Kugellagerfabriken Gesellschaft mit beschrankter Haftung, Schweinfurt, Germany

[22] Filed: Oct. 16, 1970

[21] Appl. No.: 81,423

[30] Foreign Application Priority Data
Oct. 23, 1969 Germany..........P 19 53 325.6

[52] U.S. Cl....................................................308/152
[51] Int. Cl.....................................................F16c 35/08
[58] Field of Search..................308/152; 57/130, 135

[56] References Cited
UNITED STATES PATENTS
2,668,087  2/1954  Soussloff et al............308/152

*Primary Examiner*—Martin P. Schwadron
*Assistant Examiner*—Frank Susko
*Attorney*—Richard Low and Murray Schaffer

[57] ABSTRACT

A spindle bearing housing mounted by an arrangement comprising a carrier secured to the spindle bank and depending therefrom. The carrier is provided with an upwardly facing supporting member spaced below the spindle bank, on which rests a corresponding supporting member formed on a bearing housing holder. The bearing housing is secured within the holder and extends upwardly through the recess.

9 Claims, 1 Drawing Figure

PATENTED AUG 15 1972
3,684,334
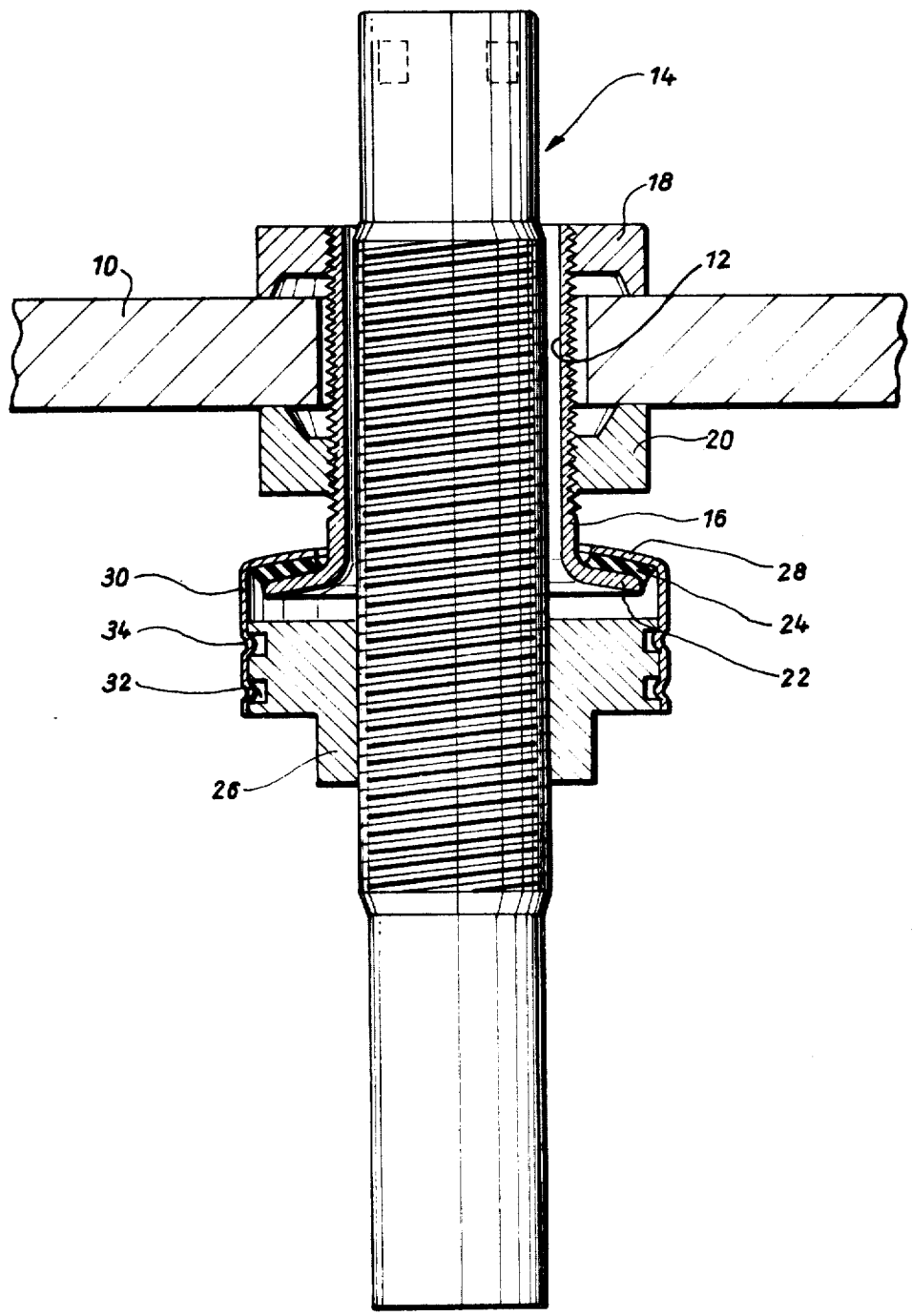
INVENTOR.
GISBERT KOHLER
BY

MOUNTING FOR SPINDLE BEARING HOUSINGS

BACKGROUND OF INVENTION

The present invention relates to the mounting and journalling of spindle bearing housings in spinning, twisting or doubling machines.

In conventional yarn spinning or twisting machines the spindle is mounted on a spindle bearing housing supported within a recess in the spindle bank. The spindle bank of course supports a plurality of such bearing housings. In order to provide such machines with quietly and smoothly operating spindles, the spindle shaft has been arranged in the bearing housing in such a manner that it can perform oscillating movements in all directions relative to the axis of the bearing housing; and the bearing housing has been mounted both pivotally as well as radial movably in the spindle bank by means of a yieldably resilient intermediate member.

The movable mounting of the spindle shaft in the bearing housing and the flexible mounting provides the necessary conditions for an automatic adjustment of the geometrical axis of the spindle shaft particularly at high rotary speeds, in spite of imbalance in the yarn spool, according to which the axis of inertia is shifted so that its effective moment of inertia has a minimum value. In other words the degrees of freedom made possible by the movable systems permit the spindle shaft to make tilting movements both around a desired pivot point as well as to shift itself parallel to its geometric axis. By the superimposition of these movements, the axis of gravity of the rotary masses of the spindle is stabilized in space.

A bearing arrangement of the type described above is shown and described in German Pat. No. 1,025,767. In the bearing arrangement of this patent, the yieldable resilient intermediary member by means of which the spindle bearing housing is supported on the spindle bank is constituted by a relatively thin disk or by a rubber bushing. A resilient power reservoir comprising a hollow spring member of yieldably resilient material provided on the opposite side of the spindle bank coaxially surrounds the spindle bearing housing in a compressed manner, thus tensioning the bearing housing with respect to the spindle bank.

The above known construction has been found to be disadvantageous in as much as it is very difficult to accurately select the dimensions and spring rates of the annular disks and the hollow springs. Furthermore, it is very difficult to pre-stress these elements to obtain the desired radial adjustability of the spindle bearing housing in the spindle bank. An attempt has been made to overcome this defect by arranging still another resilient spring between the spindle bank and the spindle bearing housing. This, however, only complicates the construction and makes the bearing arrangement very complex, although it does provide the required movability of the spindle bearing housing in the radial direction (i.e. in the direction wherein the bearing sleeve is otherwise not capable of shifting in the spindle bearing housing).

It is the object of the present invention to provide a simple bearing arrangement for spindle bearing housings and spindle assemblies.

It is another object of the present invention to provide a bearing arrangement having greater freedom of movement in the radial direction than in the axial direction.

It is another object of the present invention to provide a bearing arrangement for a spindle bearing assembly which permits relative radial and axial oscillation by which the quiet and smooth operation of the spindle can be effected.

These objects, others, and numerous advantages will be seen from the following disclosure.

SUMMARY OF INVENTION

According to the present invention the spindle bearing housing is mounted in an arrangement comprising a carrier secured to the spindle bank and depending therefrom. The carrier is provided with an upwardly facing supporting member spaced below the spindle bank and on which a corresponding supporting member extending from a bearing housing holder rests. Interposed and secured to each of the supporting members is a resilient body permitting the bearing housing to oscillate with respect to the spindle bank.

In the preferred form of the invention both the carrier and the holder are adjustably secured to the spindle bank and the bearing housing respectively, permitting the bearing housing and spindle thereon to be axially adjustable. In the specific form shown as the preferred embodiment, the carrier comprises a sleeve having a flanged end and the holder comprises a collar having a correspondingly mated end.

In the preferred form the resilient body is rubber. It is greater in its radial dimension to provide greater spring action radially of the bearing housing. It may also be provided with means for limiting axial resiliency.

Full details of the present invention are set forth in the following disclosure.

BRIEF DESCRIPTION OF DRAWING

The single FIGURE is a vertical sectional view of a spindle bank and bearing housing mounting arrangement according to the present invention

DESCRIPTION OF INVENTION

In the drawing a spindle bank 10 of a conventional spinning and/or twisting machine is shown. The spinning and twisting machines are conventional in nature and its details are therefore omitted in order to avoid a long recital of well known structures. The spindle bank 10 has a plurality of recesses 12 (only one of which is shown) for receiving an associated spindle and spindle bearing housing.

A spindle bearing housing is carried in and spaced from the walls of a tubular sleeve 16 which has an outer thread on which two clamping nuts 18 and 20 are secured. This carrier sleeve 16 extends axially through the recess 12 being spaced from the ends of the spindle bank wall and is held securely to the spindle bank by arranging the clamping nut 18 to engage the upper surface and the clamping nut 20 to engage the lower surface of the spindle bank.

The lower end of the tubular sleeve 16, which is well below the lower surface of the spindle bank 10, as viewed in the drawing, is bent outwardly into a circular flange 22 which is preferably perpendicular, or nearly so to the axis of the sleeve. An annular spring body 24 of rubber, or other elastomic yieldably resilient material is vulcanized, or otherwise adhered to the upper surface of the circular flange 22. The radial dimension of the spring body 24 is preferably a multiple of its axial dimension. Preferably the spring body is made of synthetic rubber material and may have inert filler content.

In order to arrange the spindle bearing housing axially within the sleeve 16, the spindle bearing housing is provided with a holder comprising bushing 26 which is preferably adjustable in an axial direction and which is capable of being fixed in the adjusted position. To this end the spindle bearing housing and the bushing are matingly threaded. The bushing 26 supports on its outer surface a sheet metal collar having an inwardly directed circular flange 28 adapted to seat over the spring body 24 and a cylindrical depending skirt 30. The skirt 30 is secured in a non-releasable manner to the bushing 26 by mating detent means comprising one or more annular grooves 32 in the bushing 26 and cooperating corresponding beads or folds 34 formed in the skirt 30. The inwardly directed flange 28 is vulcanized or otherwise fixed to the spring body 24 in the same manner as the body 24 is adhered to the flange 22.

The spring body 24, arranged on the stationary outer flange 22, in cooperation with the sheet metal collar and the holding bushing 26 together with the spindle bearing housing 14 constitute an oscillating system for a spindle arranged within the spindle bank recess 12, in which a greater amplitude in the radial direction, relative to the spindle bearing housing, than in an axial direction, is insured due to the effective forces during spindle rotation. With relatively heavy yarn spools it may be necessary, however, to arrange one or more inserts within the spring body 24 in order to provide boundary zones which reduce the elasticity of the spring body in the axial direction without, however, reducing elasticity in the radial direction. Such inserts may be annular disks or plastic filler panels incorporated in the vulcanized body, or other well known measures.

By the arrangement of the spring body 24 below the spindle bank 10, and by the axially adjustable arrangement of both the sleeve 16 as well as the spindle bearing housing 14 in the carrier bushing 26, it is possible therefore to adjust the level or height of the spindle, and/or spindle bearing housing, with respect to the spindle bank to obtain the most efficient height and mounting level for the type of machine to which the present invention is applied. Secondly, the present invention permits the spindle bearing to be placed in a position where a spindle brake (such as a jaw type brake) may be mounted on the spindle bank, in a manner entirely independent from the bearing arrangement. Thus the brake does not have to be associated with the oscillating bearing housing and is uneffected by any movement or vibration. Meanwhile, the center of gravity of the bearing housing is maintained well below the rotating spindle mounted on it. The problems of assembly are therefore, significantly reduced, and harmful effects to associated mechanisms are avoided.

It will be noted that the resilient spring body is compressed between the supporting sleeve and the holder bushing from the spindle bearing housing. Consequently, a greater elasticity in the radial direction than in the axial direction is assured. By chosing the dimensions of the resilient spring body the rate of resiliency in the opposed directions can be predetermined.

The resilient body may be of different shapes as for example, it may be formed as a separable independent unit whose upper and lower surfaces are provided with flanges enabling the unit to be fastened by bolt or screws to the supporting flange of the sleeve and the inwardly directed flange of the collar. The resilient body may be laminar, being formed of two or more layers of rubber or similar material. As noted earlier, inserts of non-elastic filler material may be used to create boundary zones limiting or predefining the resilient characteristics of the spring body in the axial direction. Pressure plates, pre-stressing or pre-compressing the spring body may also be used. Even with the use of such limiting features the resilient characteristics of the spring body do not change in the radial direction.

The holder bushing and the supporting carrier sleeve may also take many forms. For example, the supporting sleeve may be formed by a loop or arc fastened to the underside of the spindle bank and secured to the spindle housing. The collar may be formed by three or four arms, rather than a circular body as shown, each arm having an inwardly projecting portion vulcanized to the spring body and a depending member secured to the spindle bearing housing holder bushing. The preferred form of collar and bearing holder bushing, shown in the drawing, is particularly advantageous because of its simplicity and because of its ability to be securely adhered, by its inwardly directed flange, to the spring body. This preferred arrangement also permits the simple axial adjustment of the spindle bearing housing in the holder bushing.

An important advantage of the device, as shown, is the ability to make axial adjustment by either the threaded sleeve and the threaded bearing housing. Such adjustment is simple, effective and permits modification of the spindle level over a wide range.

It will be obvious that the numerous objects and advantages discussed do not exhaust the possibilities of the present invention. It will be appreciated, however, that through the simple mechanism of the present invention there is provided an improved bearing support arrangement enabling the spindle to effectively oscillate, shift its geometric axis, its center of gravity as well as pivot its axis or rotation and center of gravity while insuring quiet and smooth operation.

As noted many modifications can be made. The present invention is illustrative only and should therefore not be taken in a limiting sense.

What is claimed:

1. Apparatus resiliently mounting a spindle bearing housing radially spaced within the recess of a spindle bank, comprising a tubular sleeve secured within the recess of said spindle bank and axially depending therefrom, said sleeve having a radially outward extending flange forming an upwardly facing supporting surface spaced below the spindle bank, a holder for said bearing housing having an inwardly directed flange forming a downwardly facing supporting surface means for retaining the bearing housing axially within said holder and spaced from said sleeve and a resilient body interposed between and secured to said supporting surfaces to permit said housing to oscillate with respect to said spindle bank.

2. The apparatus according to claim 1, wherein said resilient body has a radial dimension greater than an axial dimension.

3. The apparatus according to claim 2, wherein said resilient body comprising a rubber spring vulcanized to the surfaces of the cooperating supporting members.

4. The apparatus according to claim 1, wherein the bearing housing holder comprises a collar secured to a bushing secured to said bearing housing, said collar extending axially of said bearing and having an inwardly directed flange adapted to be secured to the resilient body.

5. The apparatus according to claim 4, wherein said bushing is secured to said bearing housing in axially adjustable relationship.

6. The apparatus according to claim 5, wherein said collar comprises an annular sheet metal member and said collar and bushing are provided with cooperating detent means for fixedly securing the two together.

7. The apparatus according to claim 5, wherein said bearing housing and said bearing housing holder are correspondingly threaded.

8. The apparatus according to claim 1, wherein said tubular sleeve is provided with external threads and includes a pair of clamping nuts, one of which is arranged above and the other of which is arranged below the spindle bank, whereby said sleeve may be axially adjusted.

9. The apparatus according to claim 1, wherein said resilient body is provided with means for limiting the axial resiliency thereof.

* * * * *